United States Patent [19]

Krar et al.

[11] 4,098,587
[45] Jul. 4, 1978

[54] COMPACT MULTI-TUBE CATALYTIC REACTION APPARATUS

[75] Inventors: George R. Krar, Suffield; Ole L. Olesen, South Windsor; Richard A. Sederquist, Newington; Donald F. Szydlowski, East Hartford, all of Conn.

[73] Assignee: United Technologies Corporation, Hartford, Conn.

[21] Appl. No.: 827,803

[22] Filed: Aug. 25, 1977

Related U.S. Application Data

[63] Continuation-in-part of Ser. No. 753,335, Dec. 22, 1976, abandoned.

[51] Int. Cl.² ............................. B01J 7/00; B01J 8/06
[52] U.S. Cl. ....................................... 48/94; 23/277 R; 23/288 M; 165/134
[58] Field of Search ............... 48/93, 94, 95, 105, 48/196 A, 214 A; 252/373; 423/651, 652, 653, 654; 23/288 K, 288 H, 288 M, 288 R, 289, 277 R; 165/154, 155, 142, 134, 171; 122/367 PF

[56] References Cited

U.S. PATENT DOCUMENTS

| | | | |
|---|---|---|---|
| 2,543,568 | 2/1951 | Downe | 165/134 |
| 3,475,135 | 10/1969 | Gargominy | 48/94 |
| 3,541,729 | 11/1970 | Dantowitz | 48/94 |
| 3,635,682 | 1/1972 | Vine et al. | 48/94 |
| 3,909,299 | 9/1975 | Corrigan | 48/94 |

Primary Examiner—S. Leon Bashore
Assistant Examiner—Peter F. Kratz
Attorney, Agent, or Firm—Stephen E. Revis

[57] ABSTRACT

Compact reaction apparatus, such as for steam reforming a hydrocarbon feedstock to produce hydrogen, includes a plurality of reactor tubes disposed within a furnace. A portion of each reactor extends into the burner cavity or combustion volume of the furnace. Baffles, such as sleeves, are disposed around these portions of the reactor tubes to shield the tubes from excessive radiant heat from the wall of the burner cavity and to more evenly distribute heat among and around all of the reactors. These baffles permit the reactor tubes to be closely packed within the furnace and reduce temperature differences between the tubes.

11 Claims, 7 Drawing Figures

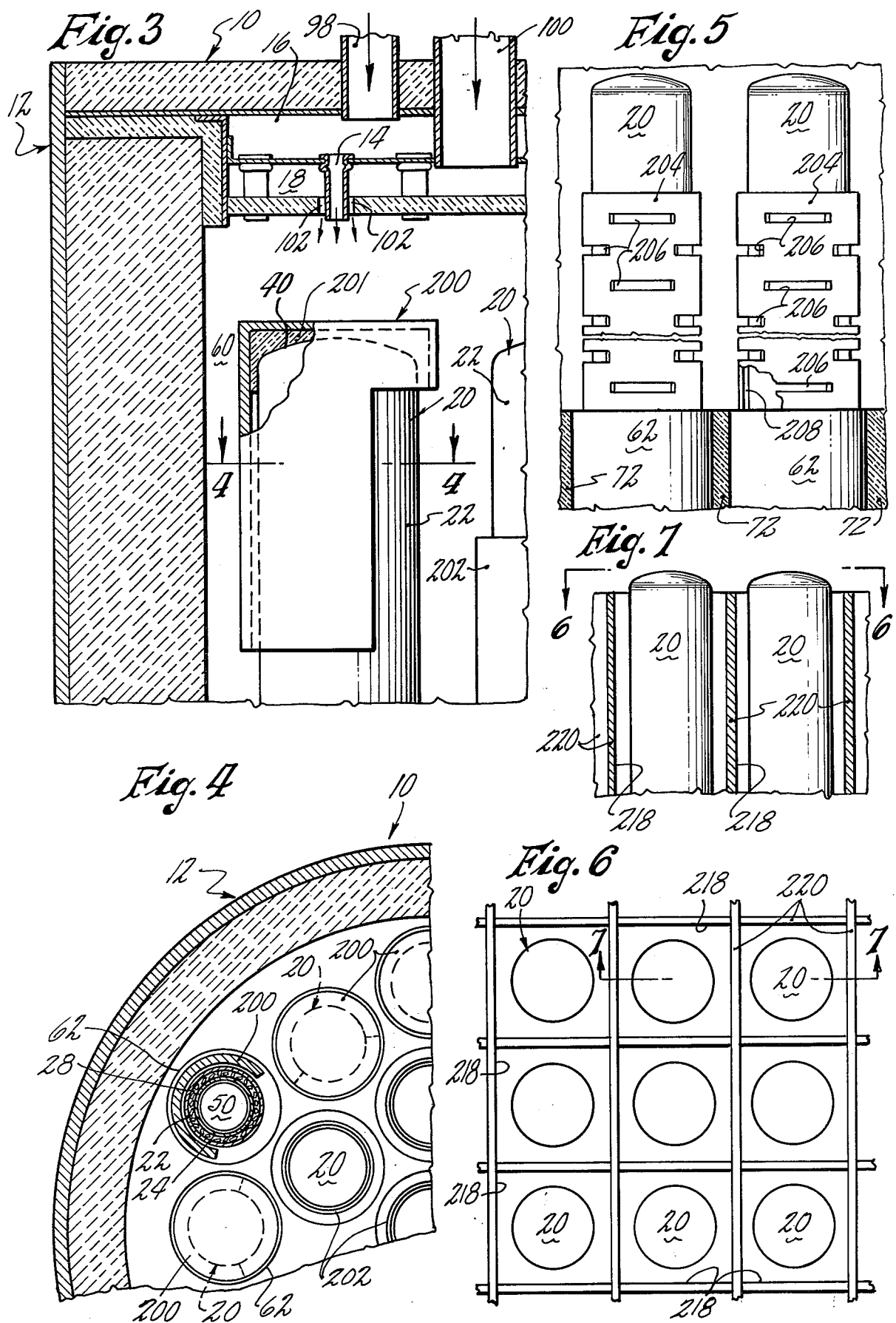

COMPACT MULTI-TUBE CATALYTIC REACTION APPARATUS

This application is a continuation-in-part of copending application Ser. No. 753,335, filed Dec. 22, 1976 now abandoned.

BACKGROUND OF THE INVENTION

1. Field of the Invention

This invention relates to catalytic reaction apparatus such as for producing product gases from a feedstock.

2. Description of the Prior Art

Catalytic reaction apparatus for converting hydrocarbon feedstocks (fuels) to useful industrial gases, such as hydrogen, are well known in the art. The most common process for producing hydrogen is steam reforming a hydrocarbon fuel by passing it through catalyst filled reaction tubes disposed within a furnace. In commercial size plants radiation from the furnace walls is the primary mode of heat transfer to the reaction tubes. This requires relatively large spacing between the tubes and having all of the tubes adjacent the walls of the furnace in order that each tube is uniformly heated by radiation from the walls. It is, therefore, not possible to dispose a large number of reaction tubes compactly within the furnace since the tubes adjacent the walls will become much hotter than those which are surrounded by other tubes; also, portions of individual tubes which do not have a direct line of sight with the furnace wall will be cooler than those portions of the same tube which do have a direct line of sight to the furnace wall, thereby resulting in nonuniform circumferential distribution of heat within certain reaction tubes. This results in reduced life of the apparatus due to local hot spots and prevents the most efficient use of the heat energy within the furnace.

SUMMARY OF THE INVENTION

One object of the present invention is catalytic reaction apparatus which is compact.

Another object of the present invention is catalytic reaction apparatus which is simultaneously compact, has improved life expectancy, and is highly efficient.

Copending United States patent application Ser. No. 753,348 titled "Catalytic Reaction Apparatus" by R. Buswell, R. Sederquist, and D. Snopkowski and filed on Dec. 22, 1976 now abandoned and having a common assignee with the present invention describes a catalytic reaction apparatus wherein a large number of reaction tubes (i.e., reactors) are compactly disposed within a furnace. The furnace has a burner cavity within which combustion of the fuel fed to the furnace takes place. One end of each tube is disposed within the burner cavity while the remaining portion of each tube is surrounded by a cylindrical wall defining an annular passageway around each tube. The furnace and the reaction tubes are constructed and arranged such that the hot gases within the burner cavity flow out of the burner cavity via the annular passageways around each tube.

Obtaining high reactor thermal efficiency and long life is a goal of the foregoing copending application as well as the present invention. Several factors must be considered in reaching that goal. Utilizing the heat energy within the furnace uniformly among the reactors is one important factor. Another is circumferential uniformity of temperature around each reactor at any particular axial location. When there are a large number of closely spaced reactors within a furnace, heating of the reactors within the burner cavity poses special problems. For example, the actual burning of the fuel within the burner cavity produces very high temperatures and as a result there is considerable radiant heating from the flame and from the walls of the cavity. Radiant heating affects only those portions of the reactors which have a direct line of sight to the source of the radiant heat. Reactors adjacent the burner cavity wall receive considerably more heat than other reactors, and, furthermore, each of them is heated to a much higher temperature on one side of the reactor than on the other. One aspect of the present invention is to minimize this overheating and uneven heating of the reactors adjacent the burner cavity wall. Even if excessive radiant heating of the reactors adjacent the wall could be eliminated, there is a general tendency for reactors which are further from the burner cavity wall and which are surrounded by other reactors to receive less heat. Another aspect of the present invention is to obtain more uniform heating of all the reactors no matter what their position within the furnace.

According to the present invention, a plurality of closely packed reactor tubes is disposed within a furnace and include portions positioned within the burner cavity of the furnace; baffles are selectively disposed within the burner cavity of the furnace to shield reaction tube wall surfaces which would otherwise receive excessive radiant heat from within the burner cavity.

Closely packed reactors or reactor tubes, as that phrase is used herein and in the claims, means a non-linear array of at least three closely spaced reactors wherein the array substantially fills the burner cavity volume and the reactors are substantially uniformly distributed and substantially uniformly spaced within said burner cavity volume and are closely spaced from each other. For examples, assuming a cylindrical burner cavity, a closely packed three reactor array may be in the shape of an equilateral triangle with one reactor at each vertex; a closely packed four reactor array may be in the shape of a square with a reactor at each corner; a five tube array may comprise a central reactor surrounded by a square array of four reactors. Nine reactors might be arranged in a square array of three parallel rows of three reactors each. A nineteen reactor hexagonal type array is shown in FIG. 2. In all cases at least a portion of each reactor in the array receives a substantially reduced amount of direct radiation from the burner cavity wall. For example, reactors adjacent the wall receive substantially reduced radiation on the side opposite the wall; also, portions of reactors receive a substantially reduced amount of radiation as a result of blockage of the radiation by other reactors in the array.

Also, for the purposes of this specification and the appended claims, "burner cavity" is hereby defined as the volume of the furnace within which actual combustion occurs.

In one embodiment the baffles are sleeves at least partially surrounding the reaction tubes adjacent the burner cavity walls for the purpose of shielding those tubes from radiant heat off the walls. Preferably, not only are the baffles designed to protect tube surfaces from excessive radiant heat, but they are also constructed and arranged to more uniformly distribute heat from tube to tube and circumferentially around each tube. The ultimate object is to have each tube see the same heating environment as every other tube so that wall temperatures are uniform from tube to tube at the same axial location and circumferentially around each tube. This reduces maximum tube wall temperatures thereby increasing tube life expectancy, and also may improve reactor thermal efficiency.

The sleeves may be made from either nonthermally conductive material, such as ceramic, or thermally conductive material such as stainless steel. Although sleeves of thermally conducting material can provide good shielding from radiant heating, the best shielding is provided by nonthermally conductive material. Thermally conducting sleeves may be advantageously employed around those tubes which do not have a direct line of sight to the furnace wall for the purpose of distributing heat more uniformly throughout the burner cavity and circumferentially about the tube which the sleeve surrounds. Any one particular array of reaction tubes may include sleeves of various lengths and shapes. A sleeve may fully or only partially surround a tube and it may have slots or other openings and cutouts which control the flow of burner cavity gases around the tubes.

The foregoing and other objects, features, and advantages of the present invention will become more apparent in the light of the following detailed description of preferred embodiments thereof as illustrated in the accompanying drawing.

BRIEF DESCRIPTION OF THE DRAWING

FIGS. 3 and 4 are fragmentary, cross-setional views of catalytic reaction apparatus showing an alternate embodiment of the present invention; FIG. 4 is taken substantially along the line 4—4 in FIG. 3.

FIG. 5 is a fragmentary, cross-sectional view of catalytic reaction apparatus showing another embodiment of the present invention.

FIGS. 6 and 7 are fragmentary, cross-sectional views of catalytic reaction apparatus showing yet another embodiment of the present invention; FIG. 6 is taken along the line 6—6 in FIG. 7, and FIG. 7 is taken along the line 7—7 in FIG. 6.

DESCRIPTION OF THE PREFERRED EMBODIMENT

Figure 1:
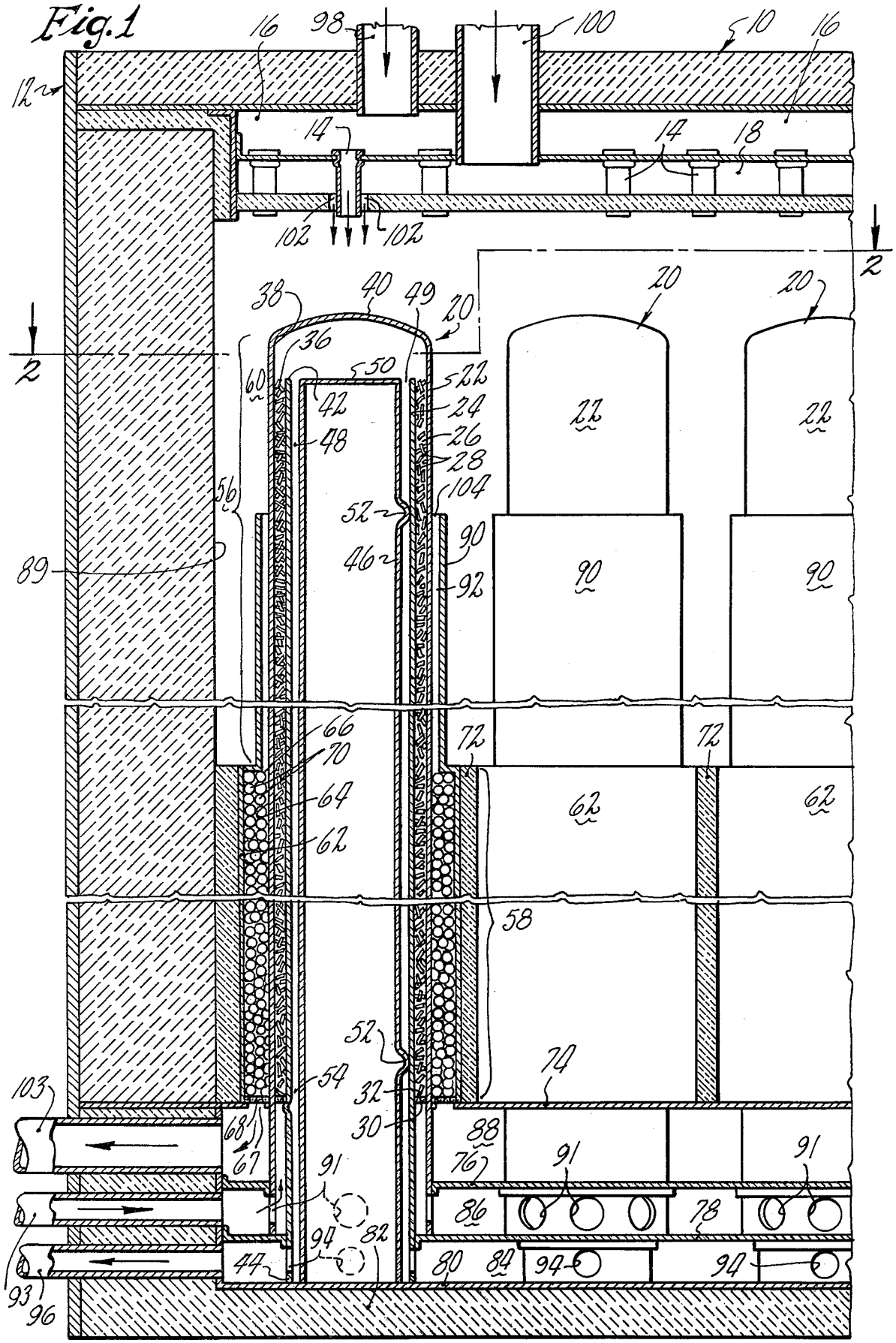
FIG. 1 is a fragmentary, vertical, cross-sectional view of catalytic reaction apparatus according to the present invention.
Figure 2:
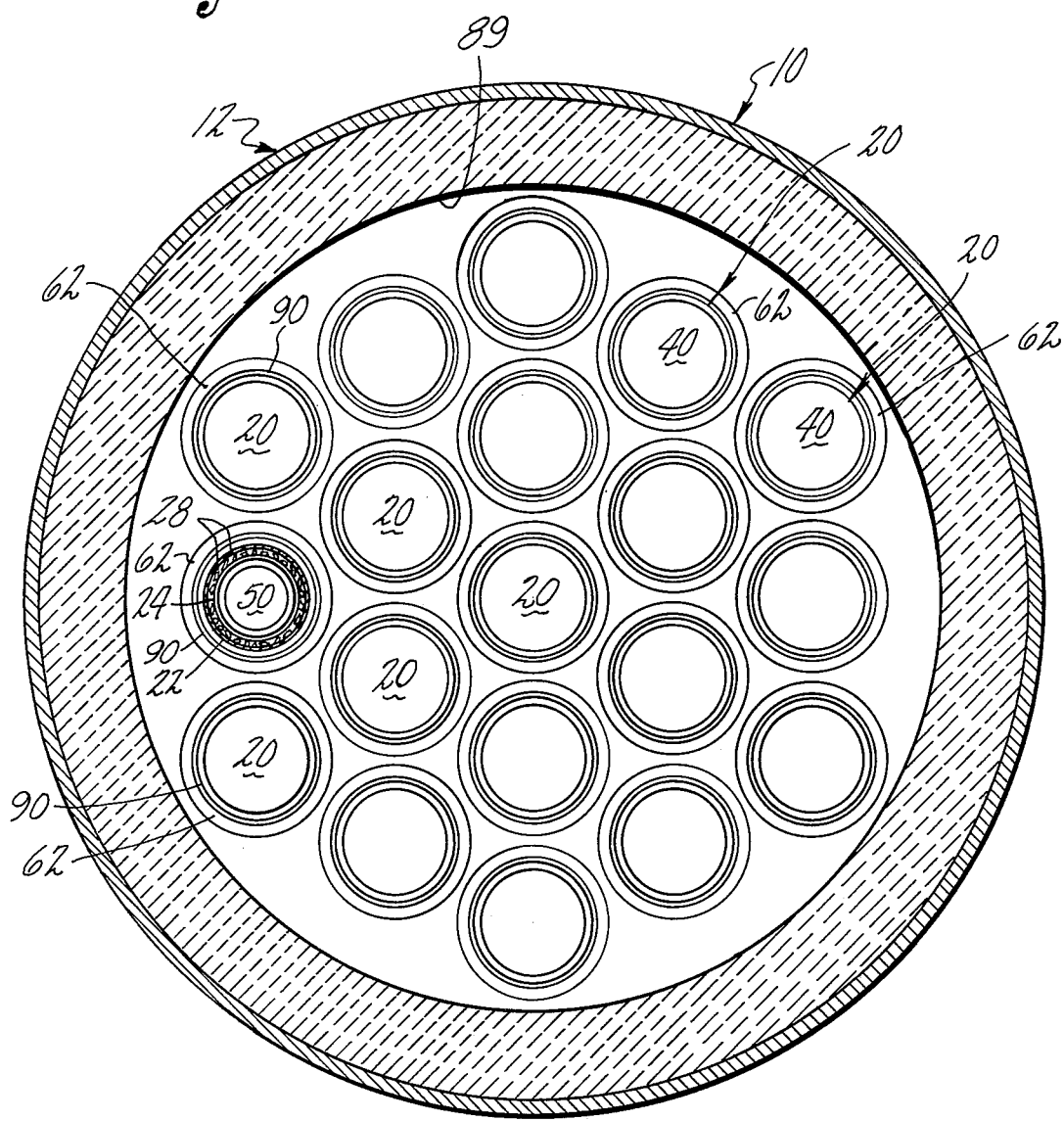
FIG. 2 is a cross-sectional view of the apparatus of FIG. 1 taken substantially along the line 2—2 of FIG. 1.

Consider, as an exemplary embodiment of the present invention, the catalytic reaction apparatus 10 of FIGS. 1 and 2. In this embodiment, the apparatus is for the purpose of steam reforming a reformable hydrocarbon fuel in the presence of a suitable catalyst in order to produce hydrogen. The apparatus 10 comprises a furnace 12 including burner nozzles 14, a burner fuel manifold 16, and an air manifold 18. Disposed within the furnace 12 is a plurality of closely packed tubular reactors 20.

Each reactor 20 comprises an outer cylindrical wall 22 and an inner cylindrical wall or center tube 24 defining an annular reaction chamber 26 therebetween. The reaction chamber 26 is filled with steam reforming catalyst pellets 28 which are supported on a screen 30 disposed at the inlet 32 of the reaction chamber. Any suitable steam reforming catalyst, such as nickel, may be used to fill the reaction chamber from its inlet 32 to its outlet 36. The cylinder which is defined by the outer wall 22 is closed at its upper end 38 by an end cap 40.

The center tube 24 has an upper inlet end 42 and a lower outlet end 44. The inlet end 42 terminates below the end cap 40 such that the center tube is in gas communication with the outlet 36 of the reaction chamber 26.

Disposed within the center tube is a cylinder plug 46 which has an outer diameter somewhat smaller than the inner diameter of the center tube thereby defining an annular regeneration chamber 48 therebetween having an inlet 49. The plug 46 may be a solid rod, but in this embodiment is a tube which is blocked by an end cap 50 at one end thereof such that reaction products exiting the reaction chamber 26 must flow around the plug 46 through the regeneration chamber 48. Spacing between the plug 46 and the center tube 24 is maintained by dimples 52 in the plug wall.

For the purposes of the reactors of this exemplary embodiment, the function of the regeneration chamber 48 is to return heat from the reaction products leaving the outlet 36 back into the catalyst bed of the reaction chamber 26; therefore, with regard to this embodiment, the outlet 54 of the regeneration chamber 48 is considered to be located adjacent the inlet 32 of the catalyst bed rather than at the outlet end 44 of the center tube, despite the fact that the actual annulus defined between the plug 46 and the center tube 24 extends to the outlet end 44. The arrangement shown in FIG. 1 provides some preheating of the process fuel before it enters the catalyst bed.

Note that the regeneration chamber 48 is substantially isolated from the hot furnace gases. For maximum overall reactor efficiency it is important to prevent the heat energy of the furnace gas from heating the reaction products within the regeneration chamber. It is also important to avoid the burning of additional fuel or hydrogen within the regeneration chamber. Only sensible heat already in the reaction products at the outlet 36 is transferred to the reaction chamber.

Each reactor 20 may be considered to comprise an upper portion 56 and a lower portion 58. The upper portion 56 is disposed within what is hereinafter referred to as the burner cavity 60. The cavity 60 is that volume of the furnace 12 within which actual combustion of the fuel and air fed into the furnace takes place. This volume is characterized by very high temperature, considerable radial heating as well as convective heating of the reactors 20, and axial (i.e., in the direction of the axis of the reactors 20) as well as radial mixing of the gases therein.

The lower portion 58 of each reactor is disposed within what is hereinafter referred to as the enhanced heating portion of the furnace in view of its being constructed and designed to increase the heat transfer effectiveness as between the furnace gases and the lower portions of the reactors. In this embodiment the lower portion 58 of each reactor is surrounded by a cylindrical wall of conduit 62 spaced outwardly from the wall 22 defining an annular burner gas passageway 64 therebetween having an inlet 66 and an outlet 67. The outlet 67 is adjacent the inlet 32 of the reaction chamber 26. The passageway 64 is filled with particles of a heat transfer packing material such as spheres 70 of alumina supported on a screen 68. The space 72 between adjacent passageways 64 is filled with a nonheat conductive material such as ceramic fiber insulation which is supported on a plate 74 extending across the furnace and which has holes therein through which the reactors 20 pass. The plate 74 and the material within the space 72 prevents the furnace gases from flowing around the outside of the conduits 62. Further details regarding enhancing heat transfer over the lower portions of the reactors 20 may be found in copending, commonly owned U.S. patent application Ser. No. 753,348 titled "Catalytic Reaction Apparatus" by R. Buswell, R. Sederquist, and D. Snopkowski, filed on Dec. 22, 1976 and which is incorporated herein by reference.

In addition to the plate 74, plates 76, 78, and 80 also extend across the furnace and define manifolds therebetween. The plate 80 rests on the bottom wall 82 of the furnace. The plates 78 and 80 define a reaction products manifold 84 therebetween; the plates 76 and 78 define a process fuel inlet manifold 86 therebetween; and, the plates 74 and 76 define a furnace gas outlet manifold 88 therebetween. The plugs 46 and the center tubes 24 abut the bottom plate 80; the outer walls 22 of the reactors abut the plate 78; and, the conduits 62 abut the plate 74.

Baffles, in the form of sleeves 90, surround the upper portions 56 of each reactor. These sleeves are made from stainless steel. The sleeves 90 around the reactors 20 adjacent the burner cavity wall 89, hereinafter referred to as "outer" sleeves, are made from stainless steel and shield these reactors from the heat radiated by the burner cavity walls. The sleeves around the remaining reactors are hereinafter referred to as "inner" sleeves. These inner sleeves radiate heat to surrounding sleeves and tend to smooth out temperature maldistributions within the burner cavity thereby reducing circumferential temperature differences around individual reactors. Note, however, that providing sleeves or shields for only those reactors adjacent the burner cavity wall or for only those portions of reactors which receive direct radiant heat from the walls is contemplated as being within the scope of the present invention since a significant and worthwhile improvement may be achieved by that alone.

It is also contemplated that the sleeves 90 need not all be the same length. The disposition and shape of the sleeves or baffles are preferably tailored to the particular array of reactors, with the ultimate goal of having the same or a very similar environment surrounding every reactor at any particular axial location and circumferentially around each reactor. (Axial temperatures will vary since the furnace gases become generally cooled as they give up heat to the reactors while moving away from the burner nozzles 14.) Maximum reactor thermal efficiency and longest life cannot be obtained if one reactor is hotter than another or if one side of a reactor is hotter than the other side.

The passageways 64, in this embodiment, are coextensive with the annuli 92 formed between the sleeves 90 and the reactors 20. Convective heat transfer to the upper portions 56 of the reactors is enhanced by the use of the sleeves 90, and is advantageous particularly as one moves further from the burner nozzles where the gas temperatures are somewhat lower and improved heat transfer effectiveness is desirable. Radiant heating still accounts for a considerable amount of heat transfer within the burner cavity; however, it is now more evenly distributed among the reactors.

In operation, a mixture of steam and reformable hydrocarbon fuel from the manifold 86 enters the inlet 32 of the reaction chamber 26 by way of the holes 91 in the wall 22; the manifold 86 is fed by a conduit 93. The mixture immediately begins to be heated by the furnace gases flowing countercurrent thereto through the passageway 64 and begins to react in the presence of the catalyst particles 28. As the fuel, steam, and reaction products travel upward within the reaction chamber 26 they continue to react and pick up additional heat. At the outlet 36 the temperature of the reaction products reaches a maximum. The hot reaction products enter the inlet 49 of the regeneration chamber 48. As the reaction products traverse the length of the annular regeneration chamber, heat is transferred therefrom back into the reaction chamber 26. They thereupon enter the reaction products manifold 84 through the holes 94 in the center tube 24, and are carried away from the reactor via the conduit 96 either for further processing, storage, or consumption.

Fuel for the furnace enters the manifold 16 via a conduit 98 and thereupon passes into the burner cavity 60 by way of the nozzles 14. Air enters the manifold 18 via a conduit 100 and enters the burner cavity 60 via annular passageways 102 surrounding each nozzle 14. Burning of the fuel and air takes place within the burner cavity 60. The outer sleeves 90 surrounding the reactors adjacent the burner cavity wall protect said reactors from excessive radiant heat from the wall. The other sleeves help distribute the heat uniformly amongst and around all the reactors. The hot gases enter the inlets 104 of the annuli 92, pass through the passageways 64, and leave the furnace via the conduit 103, giving up heat to the reactors as they pass over the surface thereof.

The present invention permits many reactors to be disposed within a furnace in a closely packed arrangement by insuring relatively uniform heat distribution to all reactors (including those in the center of a large array) as well as preventing excessive and nonuniform heating of reactors adjacent the furnace wall.

It should be apparent that the manifolding arrangement and burner construction shown in the drawing are by way of example only and are not critical to or a part of the present invention. It should also be apparent that the invention is not limited to steam reforming hydrocarbon fuels to produce hydrogen. The heat transfer concepts upon which the invention is based could apply equally well to other endothermic reactions.

FIGS. 3 and 4 depict another embodiment of the present invention. Similar reference numerals represent components which are the same as those in FIGS. 1 and 2. In this embodiment the outer sleeves 90 have been replaced by shields 200. Each shield 200 fits over the top of the reactor and partially surrounds the upper two-thirds of the length of that portion of the reactor 20 disposed within the burner cavity 60. The portion which is surrounded or shielded in that portion which faces the burner cavity wall and which would otherwise be subjected to direct radiant heating therefrom and the very highest burner cavity temperatures. The side of the reactor facing away from the burner cavity wall is uncovered. This helps achieve a more uniform circumferential temperature distribution about the reactor and permits some hot gas flow between the shield 200 and the reactor. Heat insulation 201 is disposed between the cap 40 and the shield 200. Gas temperatures, and therefore radiant heating, are somewhat less in the lower third of the burner cavity since energy within the burner cavity has already been transferred to the uppermost portions of the reactors; baffles or sleeves may therefore be omitted in this area. Reactors which are not adjacent the wall of the burner cavity are each provided with a thermally conductive sleeve 202 which extends over about the lower two-thirds of that portion of the reactor disposed within the burner cavity. They help distribute heat more uniformly among and around reactors by radiation and conduction.

FIG. 5 shows yet another embodiment of the present invention. In this embodiment each reactor 20 is surrounded by a sleeve 204 which has cutouts or slots 206 therethrough. The cutouts permit the hot gases within the burner cavity to enter the annular passageway 208 surrounding the reactors, at various points along the length of the reactors. The size, shape and disposition of the cutouts 206 and the lengths of the sleeves 204 may be tailored to achieve uniformity of temperatures among and around the reactors in accordance with the objects of the present invention. Of course, cutouts can be used in conjunction with any of the other embodiments hereinabove described, as deemed necessary or desirable to improve temperature uniformity. For any particular array of reactor tubes, experimentation with various patterns will probably be necessary in order to achieve the best results.

The embodiment of FIGS. 6 and 7 depict yet another possible baffle configuration herein referred to as the "egg crate" design. In this embodiment rectangular sleeves 218 are formed around each reactor 20 using interleaving, criss-crossing panels 220.

EXAMPLE

In a 19 tube steam reforming reaction apparatus similar to that shown in FIGS. 3 and 4 and in an array such as shown in FIG. 2, each reactor was about 60 inches long, measured from the inlet 32 and had an outer wall diameter of 9.0 inches. Half the length (30 inches) of the reactor extended into the burner cavity. The sleeves 202 were 20 inches long. Three inches separated the outer walls 22 of adjacent reactors; reactors adjacent the furnace wall were spaced 4-5 inches therefrom. The gap between the sleeve 202 and the outer wall 22 was 0.25 inch; between the outer wall 22 and inner wall 24, 1.0 inches; between the inner wall 24 and plug 46, 0.25 inch; and between the conduit 62 and the outer wall 22, 1.25 inches. The shields 200 were 18.0 inches long and surrounded their respective reactors to the extent of 180°. The sleeves 202 and shields 200 were made from stainless steel. The burner gas passageway was filled with 0.5 inch alumina raschig rings; the catalyst was in the form of cylindrical pellets.

The process fuel was naphtha which entered the catalyst bed as a vapor mixed with about 4.5 parts steam by weight. The rate of process fuel flow was about 25 lb/hr per reactor for a total fuel flow rate of about 475 lb/hr.

A conversion rate of 95% and an overall reactor thermal efficiency of 90% was achieved. The maximum average temperature variation from reactor tube to reactor tube or circumferentially around a given reactor tube at the same axial location was held to approximately 60° F. This compares to a maximum average temperature variation of about 250° F in a test using a seven tube array (one tube surrounded by six tubes) which had no baffles (i.e., shields or sleeves) in the burner cavity region.

Although not shown in any of the figures, means should be provided to prevent fluidization of the catalyst bed as a result of the upward flowing process gas. For example, the anti-fluidization means described in commonly owned, copending U.S. patent application Ser. No. 753,336 titled "Upflow Catalytic Reaction Apparatus With Anti-fluidization Means" by R. Masters, R. Sederquist, and D. Szydlowski filed on Dec. 22, 1976 could be used, and is incorporated herein by reference.

The teachings of several other commonly owned, copending U.S. patent applications filed on Dec. 22, 1976 may also be incorporated into the apparatus of the present invention if desired. These applications are: U.S. Ser. No. 753,341 "Improved Steam Reforming Process and Apparatus Therefor" by R. Sederquist now U.S. Pat. No. 4,071,330 and U.S. Ser. No. 753,334 "Multi-tube Catalytic Reaction Apparatus" by R. Buswell, R. Sederquist, and D. Snopkowski now abandoned.

Although the invention has been shown and described with respect to a preferred embodiment thereof, it should be understood by those skilled in the art that other various changes and omissions in the form and detail thereof may be made therein without departing from the spirit and scope of the invention.

Having thus described a typical embodiment of our invention, that which we claim as new and desire to secure by Letters Patent of the United States is:

1. Endothermic reaction apparatus comprising:
   a furnace for supplying heat for an endothermic reaction including an enhanced heating portion and wall means defining a burner cavity, said furnace also including exhaust means associated therewith and means associated with said burner cavity for introducing fuel and an oxidant into said burner cavity to produce hot gases therein;
   a plurality of closed packed tubular reactors disposed within said furnace, each of said tubular reactors including an axially extending reaction chamber substantially filled with catalyst, said chamber including outer cylindrical wall means exposed to the hot gases in said furnace, a first part of said chamber extending into said burner cavity and a second part of said chamber extending into said enhanced heating portion of said furnace, said second part being an extension of said first part said enhanced heating portion including inlet means and outlet means, said inlet means being in gas communication with said exhaust means, said furnace including means for directing the hot gases within said burner cavity into said inlet means and through said enhanced heating portion; and
   baffle means disposed within said burner cavity for reducing temperature differences among said reactors, said baffle means including shield means disposed between said burner cavity wall means and said reactors adjacent said wall means constructed and arranged to reduce radiant heating of said first part of said reaction chambers adjacent said wall means, said shield means at least partially surrounding said first part of each of said reaction chambers adjacent said wall means and defining a space between said shield means and said outer cylindrical wall means of said chambers.

2. The reaction apparatus according to claim 1 wherein said shield means are sleeves spaced from and surrounding said first parts of said reaction chambers adjacent said wall means defining an annulus around each respective first part, each annulus including gas inlet means for permitting the hot gas within said burner cavity to flow into said annuli, and gas outlet means in gas communication with said enhanced heating portion of said furnace.

3. The reaction according to claim 1 wherein said baffle means also includes sleeves surrounding said first parts of said reaction chambers other than reaction chambers adjacent said wall means, said sleeves being spaced therefrom and defining an annulus around each of said respective first parts, said annuli each including inlet means for permitting hot gases within said burner cavity to flow into said annuli and outlet means in gas communication with said enhanced heating portion of said furnace, said sleeves, said inlet means to said annuli, and said shield means being constructed and arranged to provide substantially the same heating environment for the first part of each reactor.

4. The reaction apparatus according to claim 3 wherein said enhanced heating portion includes wall means spaced from and surrounding said second part of each reaction chamber defining an annular burner gas passageway therebetween, each annulus defined by said sleeves being coextensive with said burner gas passageway surrounding its respective reactor.

5. The reaction apparatus according to claim 2 wherein said baffle means includes sleeves around said first part of all of said reaction chambers, said sleeves being spaced therefrom and defining annuli around each of said first parts, said annuli each including gas inlet means for permitting hot gases within said burner cavity to flow into said passageways and gas outlet means in gas communication with said enhanced heating portion of said furnace, said sleeves and said inlet means to said annuli being constructed and arranged to provide substantially the same heating environment for the first part of each reaction chamber, said furnace also including means for causing all the hot gases within said burner cavity to pass into said gas inlet means, through said annuli defined by said sleeves, out said gas outlet means, and into and through said enhanced heating portion of said furnace.

6. The reaction apparatus according to claim 5 wherein said enhanced heating portion includes wall means surrounding said second part of each of said reaction chambers and spaced therefrom defining an annular burner gas passageway therebetween coaxial with and adjacent said reaction chamber, each annulus surrounding the first part of its respective reaction chamber being coextensive with the burner gas passageway surrounding said second part of said same reactor.

7. The reaction apparatus according to claim 6 wherein each of said burner gas passageways is filled with heat transfer packing material.

8. The reaction apparatus according to claim 1 wherein said apparatus is steam reforming apparatus and each of said reaction chambers includes a steam reforming catalyst therein.

9. Catalytic steam reforming reaction apparatus comprising:
 a furnace for supplying heat for said steam reforming reaction including wall means defining a burner cavity for burning fuel therein to produce hot gases;
 a plurality of closely packed tubular reactors vertically disposed within said furnace, each including inner and outer wall means defining an annular reaction chamber therebetween containing a steam reforming catalyst, each of said reaction chambers comprising a first portion and a second portion and an inlet end and an outlet end, said first portion including said outlet end and being disposed within said burner cavity, said second portion including said inlet end and being disposed outside said burner cavity, each reaction chamber having means associated therewith defining a narrow annular heat regeneration chamber coaxial with, adjacent to, spaced inwardly from, and in heat exchange relationship with said reaction chamber, said regeneration chamber having an inlet end and an outlet end;
 baffle means disposed within said burner cavity for reducing temperature differences among said reactors, said baffle means including shield means disposed between said burner cavity wall means and said reactors adjacent said wall means constructed and arranged to reduce radiant heating of said first portions of said reactors adjacent said wall means, said baffle means also including sleeves spaced from and defining an annulus around the first portion of at least some of said reactors, each annulus including gas inlet means for permitting the hot gas within said burner cavity to flow into said annulus; and
 wall means surrounding said second portion of each of said reactors and spaced therefrom defining annular burner gas passageways therebetween coaxial with and adjacent each of said reactors and in heat exchange relationship thereto, said annuli surrounding said first portions of said reactors being coextensive with the burner gas passageways of their respective reactors, said burner gas passageways including outlet means substantially adjacent said inlet end of said reaction chamber, said apparatus including means for directing hot gases in the burner cavity through said annuli surrounding said first portions and second portions of said reactors substantially countercurrent to the flow through said reaction chamber, each reactor including means for directing reaction products from said reaction chamber outlet end into said regeneration chamber inlet end and through said regeneration chamber countercurrent to flow through said reaction chamber, said regeneration chamber being substantially isolated from heat in the burner cavity and burner gas passageway.

10. The endothermic reaction apparatus according to claim 1 wherein said reactors are vertically disposed within said furnace, and said first portions are the upper portions of said reactors.

11. The catalytic steam reforming reaction apparatus according to claim 9 wherein said first portions are the upper portions of said reactors.

* * * * *

UNITED STATES PATENT AND TRADEMARK OFFICE
CERTIFICATE OF CORRECTION

PATENT NO. : 4,098,587
DATED : July 4, 1978
INVENTOR(S) : George R. Krar et al.

It is certified that error appears in the above-identified patent and that said Letters Patent are hereby corrected as shown below:

Column 5, line 45: "cooled" should read --cooler--.

Claim 1, column 8, line 29: "closed" should read --closely--.

Claim 1, column 8, line 41: after "said" (first occurrence), insert --burner cavity and said outlet means being in gas communication with said --.

Claim 3, column 8, line 66: after "reaction" insert -- apparatus --.

Signed and Sealed this

Sixteenth Day of January 1979

[SEAL]

Attest:

RUTH C. MASON
Attesting Officer

DONALD W. BANNER
Commissioner of Patents and Trademarks